United States Patent [19]
Schmidt

[11] 3,960,188
[45] June 1, 1976

[54] PROGRAMMED CONTOUR COPYING MACHINE

[75] Inventor: Erich Schmidt, Mauerbach, Austria

[73] Assignee: Mashinenfabrik ZuckermannKomm, Ges., Vienna, Austria

[22] Filed: Dec. 19, 1974

[21] Appl. No.: 534,276

[30] Foreign Application Priority Data
Dec. 19, 1973 Austria............................ 10649/73

[52] U.S. Cl............................... 142/7; 142/3; 144/3 R; 144/47; 144/144 R; 144/144 A; 90/13.4; 90/13.7
[51] Int. Cl.² ................. B23B 3/28; B27C 5/00
[58] Field of Search ............. 142/7, 3, 1; 90/13.4, 90/13.7, 13.3, 13.6; 144/46–48, 144, 154, 136 R, 3 R

[56] References Cited
UNITED STATES PATENTS
2,814,237  11/1957  Schmid ............................. 90/13.4
2,854,040   9/1958  Gamboni .............................. 142/7

Primary Examiner—Leonidas Vlachos
Attorney, Agent, or Firm—Karl F. Ross; Herbert Dubno

[57] ABSTRACT

A contour-copying machine in which a plurality or workpieces are spanned between headstocks and tailstocks and rotatable synchronously about respective parallel axes parallel to the rotation axis of a pattern with a feeler roller engaging the pattern and a plurality of tools linked to the feeler roller cutting the contour of the pattern into the workpieces is programmed so as separately to cut longitudinally extending planar surfaces in the workpieces and to form rounded contours along these workpieces. To this end the machine is indexed through a plurality of angular positions each corresponding to one of the planar surfaces and the pattern and workpieces are restrained from rotating as these longitudinally extending planar surfaces cut into them. Once all of the longitudinally extending planar surfaces are formed, the workpiece is rotated continuously and the tools cut the remaining rounded surfaces in these workpieces. Thus it is possible in one single device accurately to form a workpiece with perfectly planar flat surfaces and accurately contoured rounded surfaces.

10 Claims, 26 Drawing Figures

PROGRAMMED CONTOUR COPYING MACHINE

CROSS-REFERENCE TO RELATED APPLICATIONS

This application is related to my copending applications Ser. Nos. 338,814 filed Mar. 7, 1973 (now U.S. Pat. No. 3,863,691), 342,803 filed Mar. 19, 1973 (now U.S. Pat. No. 3,865,162), 498,370 filed Aug. 19, 1974, and 512,607 filed Oct. 7, 1974.

FIELD OF THE INVENTION

This invention relates to a method of and apparatus for shaping a workpiece according to a pattern. More particularly this invention concerns a system which reproduces the contours of an elongated pattern in an elongated workpiece blank.

BACKGROUND OF THE INVENTION

In a well known-method of reproducing the contours of a pattern in a workpiece blank it is known to rotate both the pattern and the blank about parallel axes. A feeler, usually carrying a roller and mounted on a pivotal arm, is urged against the pattern and a tool carried on another arm linked to the feeler arm is urged against the blank. The feeler and the tool are jointly displaced along the synchronously rotating workpiece and pattern so that the exact contours of the pattern are cut into the workpiece. To this end the tool is usually a milling head or a sander.

A principal disadvantage of this system is that the feeler and tool follow generally helical paths along the surface of the pattern and workpiece such that any scratches or marks made by the tool are generally helical. This is particularly bothersome when a wooden workpiece is being shaped with the grain of the workpiece extending parallel to the axis of rotation.

Yet another disadvantage of this system is that it is difficult accurately to reproduce flat surfaces in the workpiece. Such surfaces are frequently needed in the production of gunstocks, table legs, and the like.

In another known system the workpiece is held on a carriage which is displaced longitudinally past a row of tools each operated with a respective template. This system allows the extremely accurate reproduction of flat surfaces and turns out a very high-quality product. The disadvantage of this system is that is it necessary to use a great many templates and a great deal of equipment to produce a single item. Thus production costs are elevated. It has been suggested in this arrangement to reduce the equipment investment by mounting the workpiece on the carriage so as to be rotatable about its axis such that one edge of the workpiece is shaped, then the workpiece is rotated through 90°, then another edge is shaped, and so on. Nonetheless this system remains quite expensive so that production costs are high.

OBJECTS OF THE INVENTION

It is therefore an object of the present invention to provide an improved method of and apparatus for shaping a workpiece.

Another object of the invention is the provision of a system wherein it is possible rapidly and accurately to reproduce both curved and flat surfaces of a pattern in a workpiece.

Yet another object is the provision of an arrangement which allows a plurality of workpieces simultaneously to be shaped, with the roughing and fine-finishing operations all being carried out by a single relatively simple device.

SUMMARY OF THE INVENTION

These objects are attained according to the present invention in an arrangement wherein the drive which synchronously rotates the workpiece and the pattern about their respective rotation axes is connected to a control system which is also connected to the device which longitudinally advances the feeler and the tool along the workpiece. The system is arranged such that the flat surfaces of the pattern are reproduced while both the pattern and the workpiece are restrained from rotation about their respective axes. Helical surfaces are machined into the workpiece during rotation of the pattern and workpiece at a relatively slow speed and surfaces which are curved in section, that is the remaining contours of the pattern, are cut into the workpiece during rotation of the pattern and workpiece synchronously at a relatively high or full speed.

A considerable advantage of this system is that it allows the reproduction from a single pattern of workpieces having both rounded and planar surfaces by a single apparatus that is set up automatically to shape the workpiece. In this manner it is possible to produce accurately shaped products with a relatively compact apparatus in a relatively short time. Thus production costs are considerably reduced. In addition it is possible with the apparatus according to the present invention to make a product that is so accurately machined that planar surfaces cut therein can be used without any subsequent trueing.

This is effected in accordance with the present invention by subdividing the pattern longitudinally into a plurality of zones each corresponding to the starting point or ending point of a particular planar surface. Sensor means are provided for detecting positions of the feelers relative to the zones and for controlling the displacement speed and direction of the feeler and tool and the rotation speed of the workpiece and pattern in accordance therewith.

In accordance with another feature of this invention there is provided angular indexing means for jointly rotating the pattern and the workpiece through identical angular distances. It is also within the scope of the invention to form workpieces with both curved and flat surfaces by providing a cutout device in the apparatus which lifts the tool in the region of edges which are either united as an integral part of the control system or are formed by a separate lifting or cutout pattern which is held in the apparatus rotatably about a respective axis. This cutout model is rotated synchronously with the pattern and is engaged by a respective feeler which is automatically connected to the other arms by the control system at predetermined intervals.

The apparatus according to the present invention is provided with one or more longitudinally displaceable carriages or slides each having at least two linked-together pivotal arms, one of which carries the feeler and the other the tool.

According to yet another feature of this invention these carriages are paired on opposite sides of the workpiece and the tools can press against opposite faces of the workpiece and therefore simultaneously carry out two shaping operations, or a shaping operation and a finishing operation. The considerable advantage of this arrangement is that oscillations created by lateral pressing of the tool on the workpiece are almost completely eliminated because another tool is pressed in the opposite direction on the opposite side of the workpiece.

BRIEF DESCRIPTION OF THE DRAWING

The above and other objects, features, and advantages of the invention will become more readily apparent from the following description, reference being made to the accompanying drawing in which.

SPECIFIC DESCRIPTION

Figure 1:
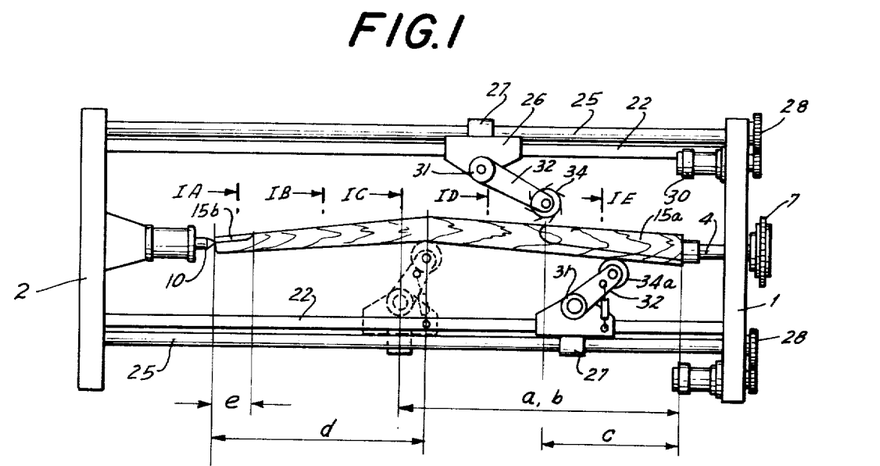
FIG. 1 is a side view of an apparatus in accordance with this invention.
Figure 2:
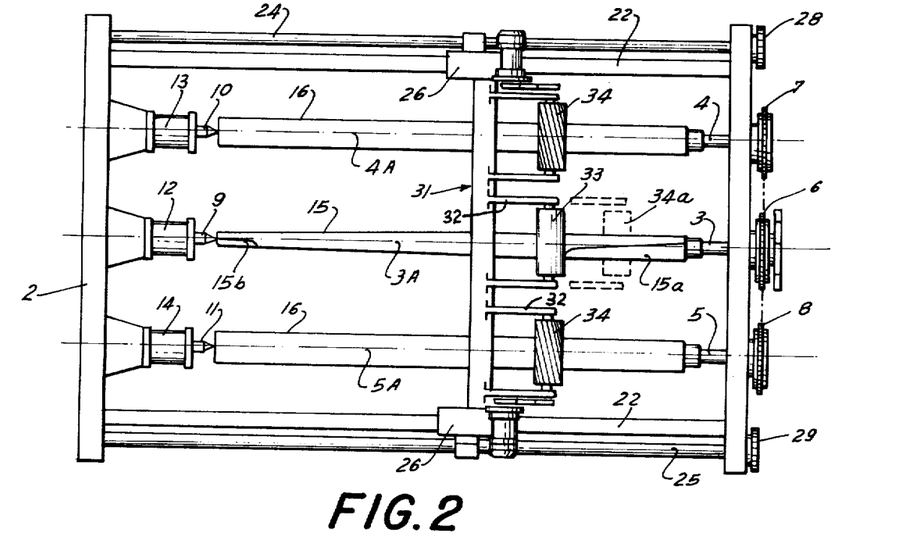
FIG. 2 is a top view of the apparatus of FIG. 1.

As shown in FIGS. 1 and 2 a contour-copying machine in accordance with the present invention has a pair of end supports 1 and 2. The support 1 is provided with three headstocks 3, 4, and 5 which are driven to rotate about respective parallel axes 3A, 4A, and 5A by respective worm wheels 6, 7 and 8. Aligned with the headstocks 3, 4, and 5 are respective tailstocks 9, 10, and 11 carried on respective hydraulic actuators 12, 13, and 14, in turn mounted on the end support 2.

Figure 1A:
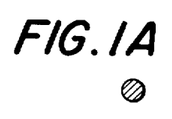
FIGS. 1A–1E are sections taken along respective lines IA—IA through IE—IE of FIG. 1.
Figure 1B:
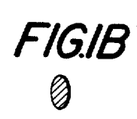
Figure 1C:
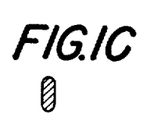
Figure 1D:
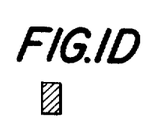
Figure 1E:
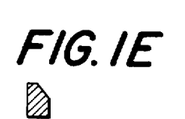

Spanned between the headstock 3 and tailstock 9 is a pattern 15 formed adjacent its ends with flat surfaces 15a and 15b and having the sections illustrated by FIGS. 1A-1E. As shown in FIG. 1E the pattern 15 has in one end region c a 5-sided cross-section. In addition in the entire end region a, b the pattern 15 lies within a rectangular cross-section as indicated in FIG. 1D with opposite parallel faces. The other entire end region d as shown in FIGS. 1A-1C is of round or rounded cross-section, with the surface 15b existing in a region e at the very end thereof. In addition it should be noted that the workpiece 15 although elongated is not straight or symmetrical, here being a bent table leg.

Spanned next to the pattern 15 between the headstocks 4 and 5 and respective tailstocks 10 and 11 are workpiece blanks 16 which are rotated about the axes 4A and 5A synchronously with the pattern 15. The worm wheel of the headstock 3 meshes with the drive worm 17 and the wheels 7 and 8 of the headstocks 4 and 5 with respective worms 18 (see FIG. 3) carried on a common shaft 20 which is the output shaft of an electric motor 21. A brake disc 23 carried on the shaft 20 is restrained from rotating as will be described below whenever the motor 21 is switched off so that the pattern 15 and workpieces 16 are either rotated jointly or are angularly fixed relative to one another.

Between the sides 1 and 2 of the machine frame there are provided above and below coplanar axes 3A, 4A and 5A a pair 24 and 25 of leadscrews. Inwardly and parallel to each of the leadscrews 24 and 25 is a respective tie-rod 22. In addition each of the leadscrews 24 and 25 is threaded into a nut on a respective slider or carriage 26. Gear wheels 28 and 29 carried on the shafts 24 and 25 and driven by motors 30 serve synchronously to rotate them all at the same rate and in the same direction so that all of the carriages 26 will move identically along the axes 3A–5A. A pair of sliders 26 is interconnected by a pivot axle 31 which extends transverse to the axis 3A–5A and in a plane parallel to the plane of these axes. A separate pair of arms 32 over each axis 3A–5A rotatably mount either a feeler roller 33 for the pattern 15, a milling head 34 for the upper sides of the workpieces 16, or a sanding drum 34a for the lower sides of the workpiece 16. Springs 19 urge the feeler roller 33 and the sanding drums 34a of the lower carriages 26 up into engagement with the pattern 15 and workpieces 16, whereas gravity alone serves to urge the feeler roller 32 and miller 34 down against them. Separate motors which are not referenced in the drawing serve to rotate the milling head 34 and sanding drum 34a as described in the above-cited copending application.

The disc 23 can be seized between a pair of brake shoes 35 and 36 carried on respective arms 38 and 37 pivoted jointly at a fixed pivot 39. A piston rod 42 attached to the piston 43 of a double-acting cylinder 41 serves to press these two levers 38 and 37 apart against the force of the spring 40 normally biasing together so as to release the disc 23. This cylinder 41 is pressurizable through hydraulic lines 45 connected through a receiving valve 44 to a pump 46, a valve-operating solenoid 47 being electrically energizable to pressurize the cylinder 41 so as to close the brake on the disc 23.

The solenoid 47 is connected in parallel to the winding 49 of the relay 50 with contacts connected in the circuit 51 of the drive motor 21 so that immediately before the switching on of the brake 23, 35–43 the relay 50 is switched off to stop the motor 21.

Figure 3:
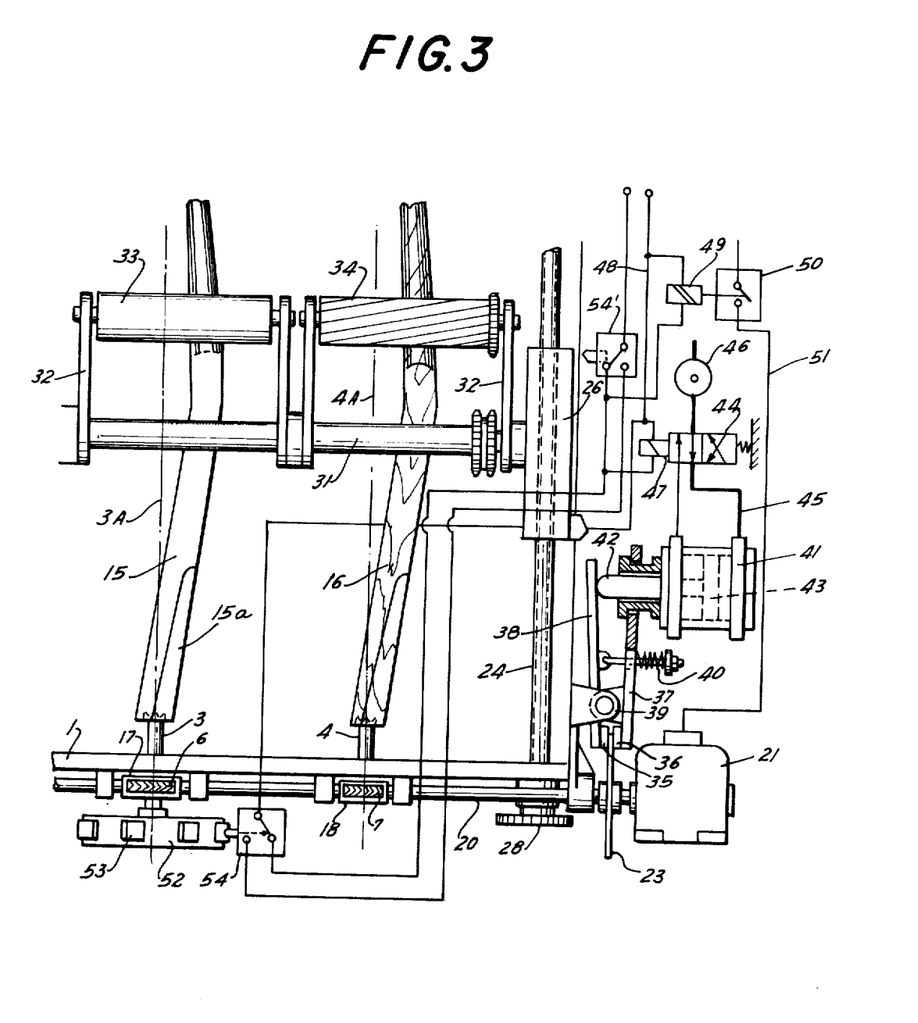
FIG. 3 is a detail of FIG. 1 illustrating specific parts of the control circuit.

As also shown in FIG. 3 there is provided on the shaft of the headstock 3 a wheel 52 provided with a plurality of angularly spaced bumps 53 which can be moved around the wheel at any angular location thereon so as to actuate a spdt switch 54 whose pole is connected to the input line 48 and whose two output contacts are connected to the similar two contacts of another spdt switch 54' now actuated by a pump 54'' provided on one of the carriages 26. The switch 54' is provided at a location on the machine such that it is actuated from its illustration position when the tools 34 reach the ends of the workpieces 16 at the tail pieces 10 and 11, a position hereinafter referred to as III, position II being a central position and position I being a position at the opposite end of the workpieces.

Figure 12:
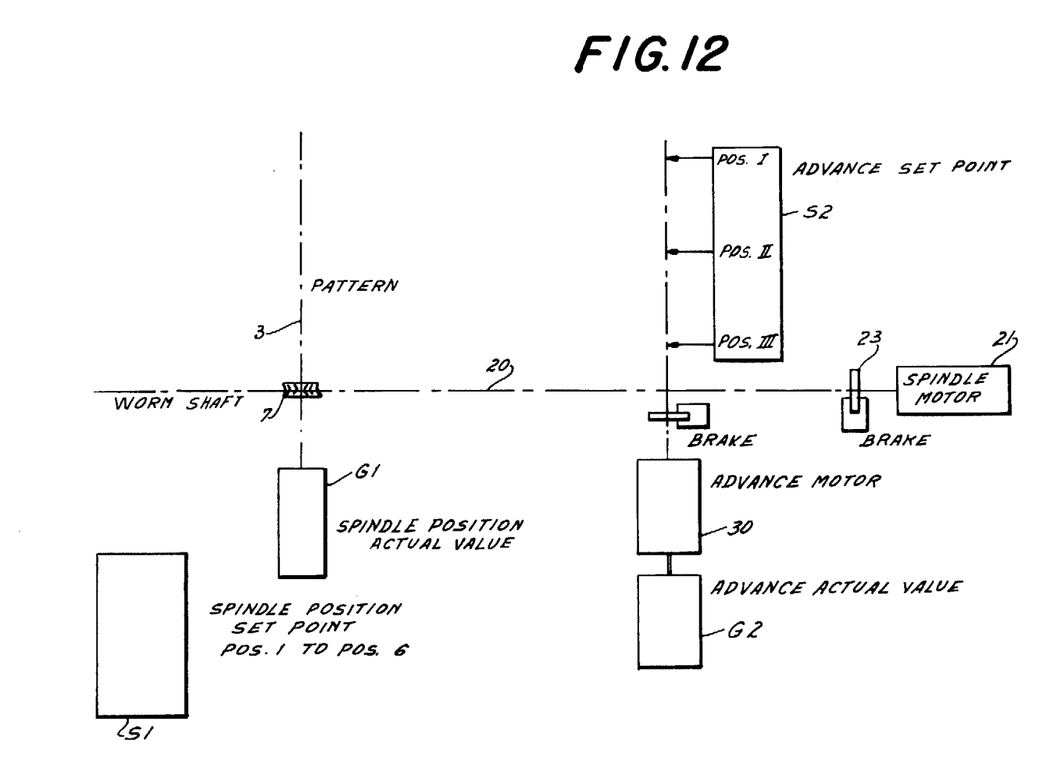
FIGS. 12 and 13 are schematic views illustrating the control system according to the present invention.
Figure 13:
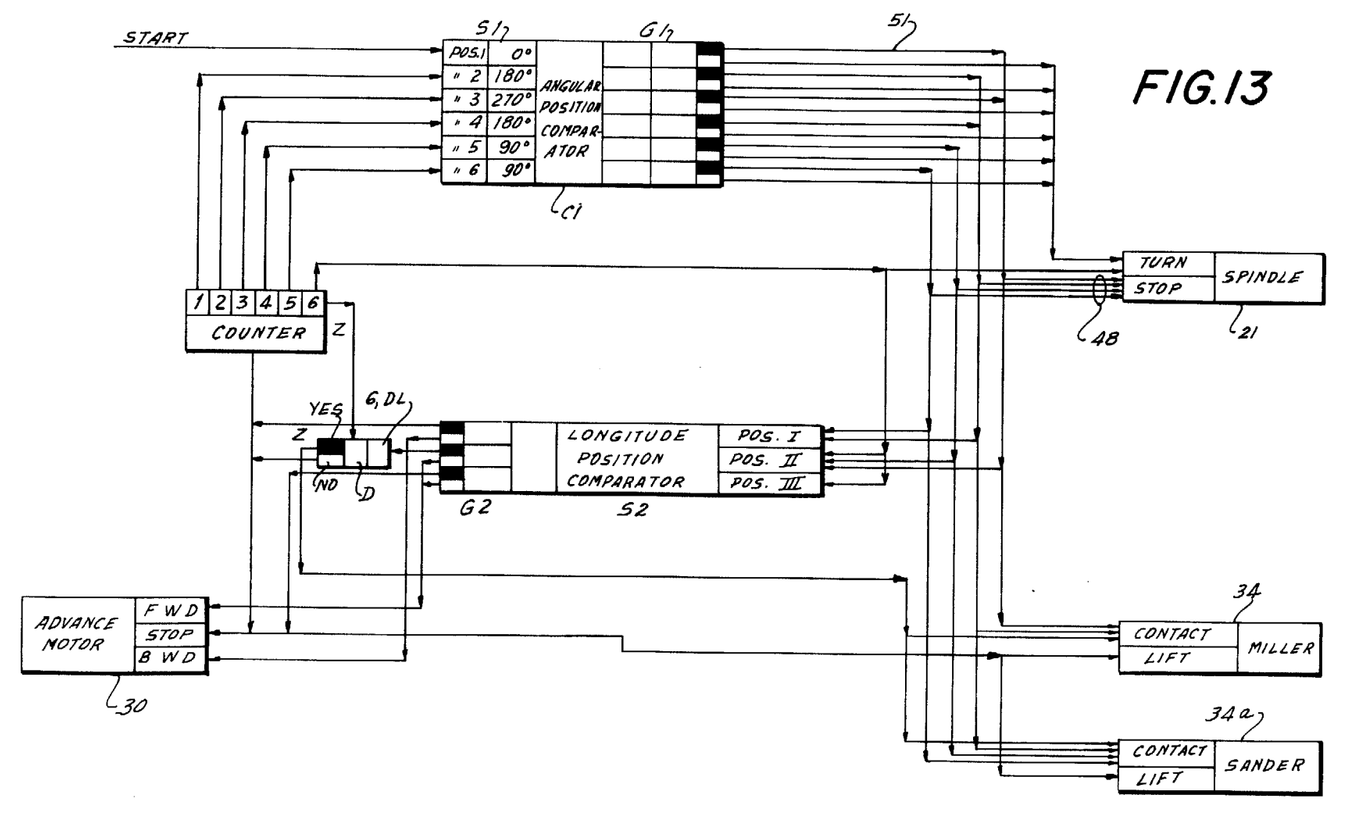

The control system shown in FIGS. 12 and 13 has a control unit S1 whose output corresponds to the single-position set point or angular position that the pattern 15 and workpieces 16 occupy, as one of six positions. These set points are compared in an angular-position comparator C1 with the actual positions from an actual-position detector G1 which is formed at least in part by the wheel 52 and the switch 54. If the two positions are the same or equal an output will be produced in the solid blank box shown to the right of G1 in FIG. 13 and if they are not the same an output will be produced at the unequal white boxes shown at the right of G1 in FIG. 13. These outputs are fed to the motor 21 rotating headstocks 3 – 3, to actuating means 34' for lifting the miller off the workpieces 16 and to actuators 34' for lifting the sander off the workpieces 16. In addition this output is fed via a second comparator S2 which is connected through a second circuit G2 that determines whether the carriages 26 are in positions I, II, or III and the output from this arrangement G2 is fed to the motor 30 which is reversible. A six-position counter Z shown in FIG. 13 serves to advance the system from one operation to another.

Figure 4:
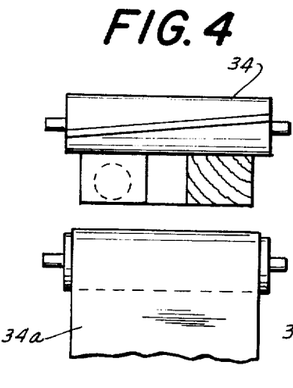
FIGS. 4–11 are end views illustrating the operation of the device shown in FIGS. 1–3.

The device operates as follows:

A signal is fed to the unit S1 via a start line. As long as the workpieces are in 0° position I, the gate of the uppermost portion of the comparator G1 will generate an output that will be fed to the advance motor 30 through the units S2 and G2 until the carriages reach longitudinal position II. At the same time the miller actuator 34' is actuated so as to drop the miller 34 onto the respective sides of the workpieces 16 as illustrated in FIG. 4. Meanwhile the sanders 34a are held out of contact with the other side of the workpieces 16. This signal also serves to actuate the brake 23, 37 – 46 for the spindle drive 21 so as to restrain rotation of the workpieces 16. In this manner it is possible to produce very flat surfaces on the upper sides of the workpieces 16.

Figure 5:
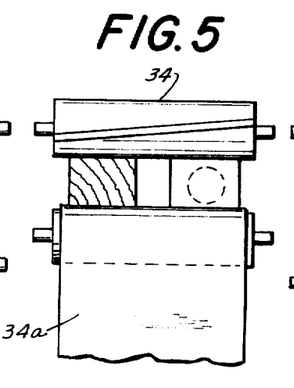

Once however the tools advance to position II the output from the position II gate of unit G2 will switch from the white to the black thereby stopping the advance motor 30. At the same time a pulse is fed via a unit D to the counter 2 to advance it to its second output thereby feeding an input into the unit S1 requiring the workpieces 16 and pattern 15 to be rotated through 180°. At the same time the miller actuator 34 is energized so as to lift the miller off of the workpiece so that no damage occurs through rotation of the workpiece during 180°. Once the 180° rotation is effected the output of the respective gate of the circuit G1 will indicate that the actual position and the desired position are the same and the spindle drive 21 will be stopped. Both the miller actuator 34' and the sander actuator 34a' are now energized so as to drop the miller and the sander onto the workpiece as shown in FIG. 5. Meanwhile the advance motor 30 is operated via the position I gate of unit G2 so as to pull the carriages 26 backward on the unit, thereby simultaneously milling the opposite side of the workpiece and sanding the previously milled side.

Figure 6:
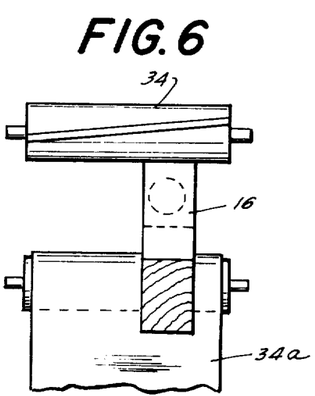

On attaining position 1 an output from the respective gate of unit G2 is again fed to the counter Z to the motor 30 to stop this motor, and to the actuator 34' and 34a' so as to lift the miller and sander free of the workpiece 16. The spindle drive 21 is thereby actuated until the pattern and workpiece have rotated through 270° whereupon an = signal comes out of the respective gate of unit G1 which again serves to drop the miller 34 down on to the workpieces 16 while stopping rotation thereof. At the same time the advance motor is energized to move the carriages 26 forward, this is indicated in FIG. 6 where it is shown that the sander 34a is out of contact with its respective face of the workpiece 16.

Figure 7:
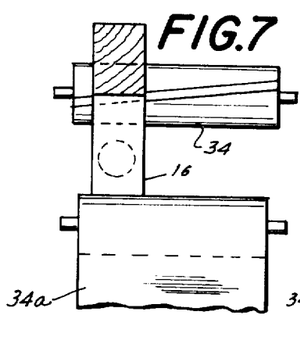

Once the carriages again reach position II on output from the position II gate of unit G2 is fed via the circuit D which once again stops the motor 30, lifts the miller 34 and the sander 34a from the workpiece 16 and advances the counter Z by one unit. The workpiece is rotated again through 180° and once this position is attained as described above the spindle drive is stopped and both the miller and sander are dropped onto the workpiece. The motor 30 is reversed so as to draw the millers 34 and the sanders 34a back from the central position II as shown in FIG. 7.

Figure 8:
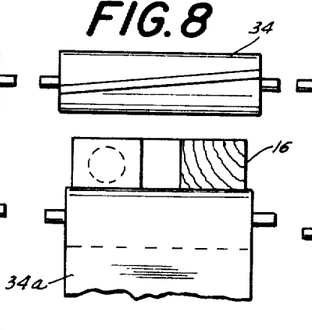

Position I having again been attained the respective gate of unit G2 stops the motor 30 and lifts the sanders 34a and the miller 34 from the workpiece and effects via unit S1 at 90° rotation with the spindle drive 21. After having rotated through this 90° the sanders 34a only are pressed against their side of the workpiece so as to finish-sand this side with the carriages 26 moving forwardly from position I to position II as shown in FIG. 8.

Figure 9:
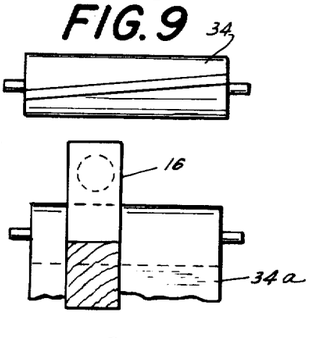

Again the unit is stopped and the sanders and millers lift from the workpiece when position II is attained and the counter Z is advanced to rotate the pattern 15 and workpieces 16 through 90°. This completed, the sanders 34a are dropped back into the contact with the underside of the workpieces 16 and the carriages are withdrawn from position II to position I so as to finish-sand this last side of this region on the workpieces as shown on FIG. 9.

Figure 10:
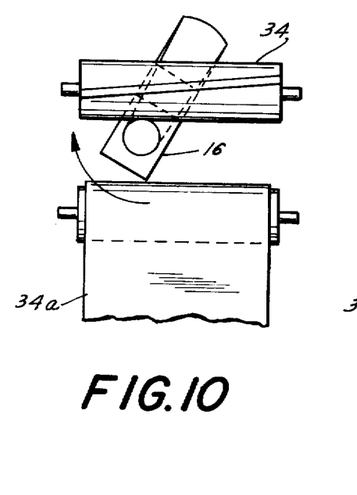
Figure 11:
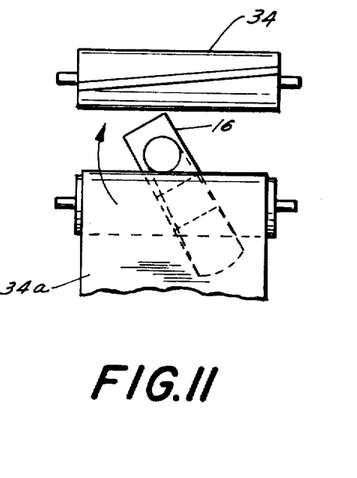

Once position I is again attained an output from the respective gate from the unit G2 stops advance via the motor 30 and lifts the miller and the sander fully out of contact with the workpiece. At this state of the operation the region a, b of the workpiece is completely shaped. The counter Z is again actuated and gives an output to the device D and to the turn actuator for the spindle drive 21 (in reality the windings 47 and 49 of FIG. 3). This causes the workpiece to rotate at full speed with the millers 34' and 34a' completely out of contact until they reach position II when an output is fed from the respective gate of unit G2 to the side 6, DL of the circuit D. This circuit D functions as an AND gate and generates an output with its input line from the counter Z and from the position II gate of unit G2 so as to drop both the millers 34' and the sanders 34a' onto the workpiece while it continues to rotate and while the motor 30 is operating to advance the carriages 26 toward position III. Since the sanders 34a are slightly behind the millers 34 this mills and finish-sands the workpieces 16 in one operation with the tools faithfully reproducing the exact rounded contours of the patterns in the workpieces 16. This operation is illustrated in FIGS. 10 and 11 when the complete end of the track is reached, that is an output is generated by the respective gate of the unit G2 so as to stop the advance motor 30 and lift the millers 34 and sanders 34a from the workpieces 16. At this time the operator need merely take the fully shaped workpieces 16 out of the unit and replace them with blanks, then start the entire operation over again.

In this arrangement illustrated in FIG. 3 the wheel 52 is provided with eight angularly equispaced bumps 53 so that in effect the apparatus S1 which is the angular-position detector of the wheel actually comprises a plurality of counters. The counter for position II only gives an output after two of the bumps have passed the switch 54, the output of position III after three further bumps and so on. Simple reed switches arranged along the path of the carriages 26 are usable for the actual valves of the longitudinal position of the device shown at S2. The actuators 34' and 34a' that lift the millers and sanders from the pattern 15 and workpieces 16 can be comprised as a simply hydraulic cylinder actuated by a solenoid-operated valve, with the valve normally in a position corresponding to the contact position of the respective tools on the workpieces and pattern. It should also be noted that the particular order of steps shown here is in no way intended to limit the present invention. It is possible to use them in inverse order or to otherwise mix up the steps. Thus, for example it is possible to mill a flat surface, then to simultaneously mill and sand the round-section of the workpiece and then return and form another flat surface, and so on. It is also possible to provide further index positions which are not necessarily offset to one another at 45° or 90° so as to form for example the flat surfaces 15a and 15b.

Figure 14:
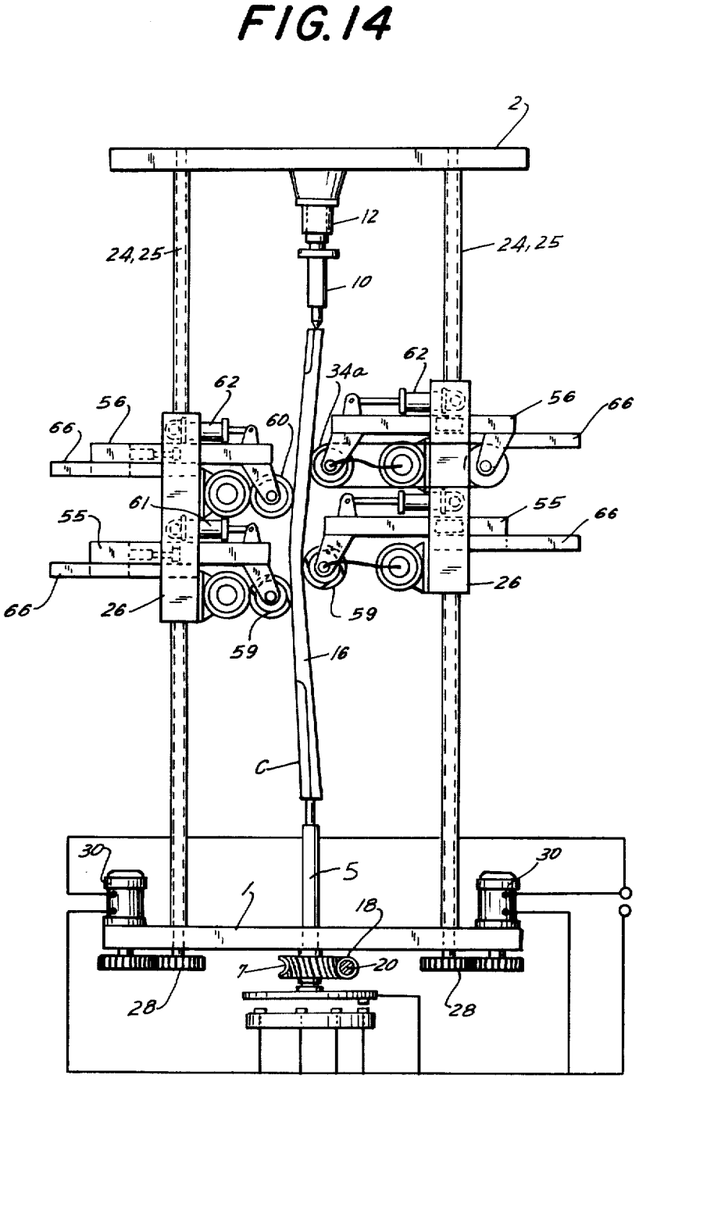
FIG. 14 is a side view of yet another apparatus in accordance with this invention.
Figure 15:
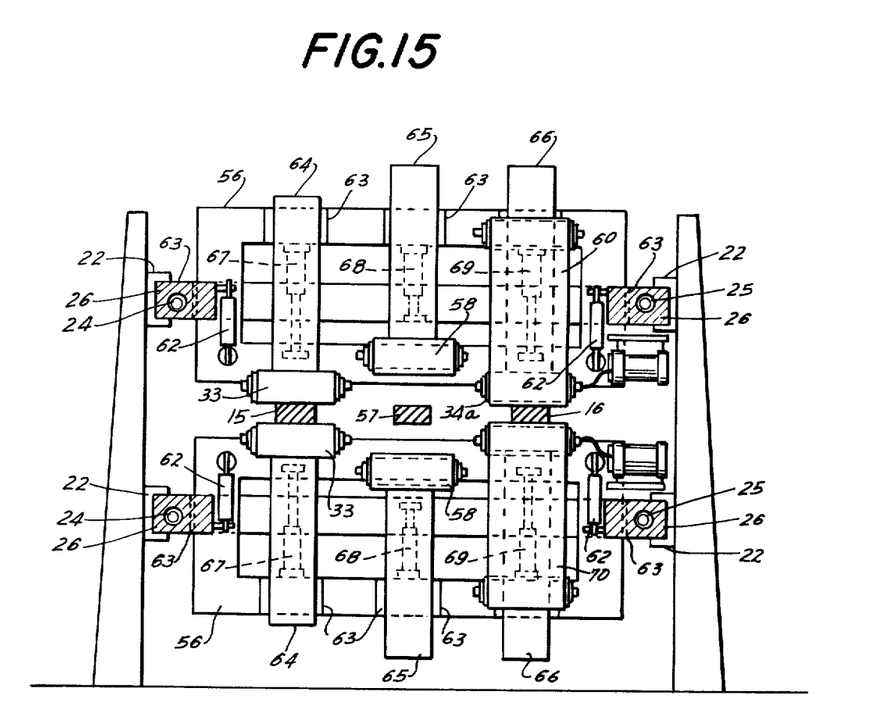
FIG. 15 is a cross-section to the apparatus of FIG. 14.

In the apparatus according to FIGS. 14 and 15 there is shown a device where the slides 26 are provided with several vertical slides 55 and 56 one of which, as shown in FIG. 15, has a roller 33 engaging a model 15 and another of which has a copy roller 58 which can engage a lifting or cutout model 57 and which also carries a milling head 59 or a sander 60. The carriage 26 is formed as an open frame and is displaced longitudinally as described above by leadscrews 24 and 25 the length of the model 15. The vertical slides 55 and 56 are slidable vertically on the carriage 26 and are spaced from each other. Furthermore each of the vertical slides 55 and 56 is urged toward the workpiece by a respective hydraulic adjusting cylinder 61 and 62 and can also be pulled back away from the model 15 with this cylinder.

In the illustrated example each of the slides 55 and 56 is provided with three vertically slidable guides 63 carrying slide pieces 64, 65, 66 formed at one end as a pivot fork. The slide piece 64 carries a copying roll 53 that engages the pattern 15. The piece 66 carries either a miller or a pressure roller 34a of an endless sanding belt that engages the workpiece 16 and the piece 65 has a copying roll 58 which rests on the cutout or lifting model or pattern 57. In addition each of these slide pieces 64, 65 and 66 is vertically adjustable relative to the vertical slide 55 and 56 by a hydraulic adjusting cylinder 67, 68 or 69 respectively. In this manner it is possible to urge either of the copying rollers 33 or 35 or of the workpieces 34 or 70 with corresponding pressure against the pattern 15, the pattern 57, or the workpiece 16. It is also possible to lift any of these elements out of contact with its respective workpiece or pattern. As shown in the drawing there is provided above and below the workpieces and patterns a copying slide 26 each provided with two vertical slides 56 and 55 which are slidable in 6-section guides 22 so that the workpieces can be shaped and finished from both sides simultaneously.

It is possible in this apparatus to have relatively coarse and relatively fine milling heads or relatively coarse and relatively fine sanders. Alternately one can provide as described with reference to FIGS. 1 – 3 a miller and sander. It is thus possible to simultaneously shape and finish-sand the workpiece in one single pass.

Figure 16:
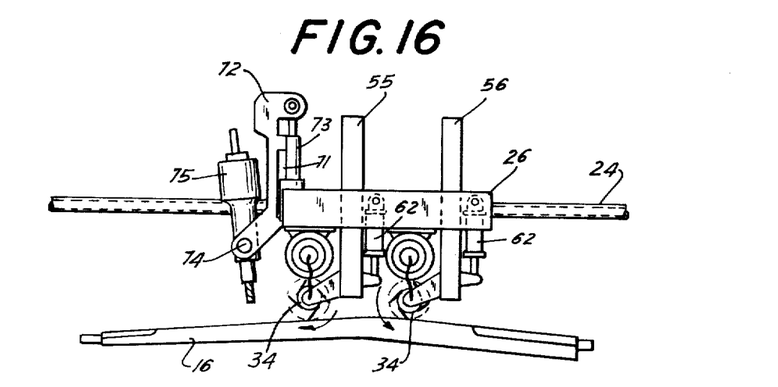
FIG. 16 is a side view of yet another apparatus in accordance with the present invention.

FIG. 16 shows a slide 26 provided with two vertical slides 55 and 56. In addition the slide 26 has on one of its ends a vertically extending guide 71 for a further slide 72 which is displaceable relative to the slide 26 by means of a hydraulic cylinder 73. The vertical slide 72 is provided on its under end with a fork 74 in which a drill 75 is mounted, pivotal about the axis of the fork 74 for angle drilling. The drill 75 can also carry a milling head. The movements of this element are controlled by the programmed control device so as to work the machine when the slide 26 is fixed. To this end the controls devices S1 and S2 as well as the indicators G1 and G2 have several extra positions during which the slide 26 and the cylinder 72 are actuated in order to drill a hole or mill a shape in the side of the workpiece 16.

Figure 17:
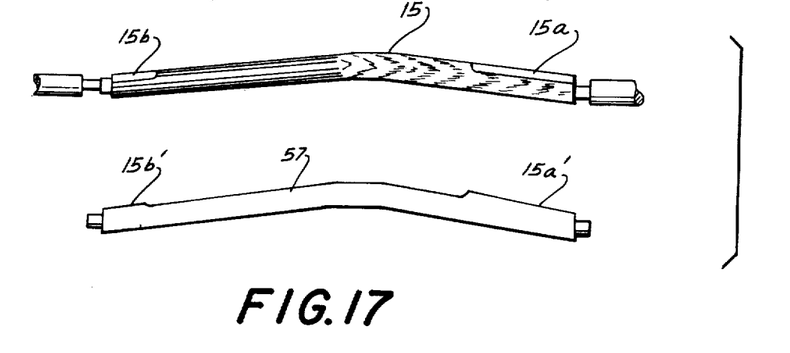
FIG. 17 is a side view illustrating a cutoff or lifting pattern and the workpiece produced thereby in accordance with this invention.

FIG. 17 shows a lift or cutoff model 57 for example spanned between the head and tail pieces 5 and 10 and engaged by a copy roller 58 which is carried on a respective vertical slider 65 (FIG. 15) and which can be lifted by its cylinder 68 from the cutout model 57. This model 57 has end raised portions 15a' and 15b' corresponding to the 15a and 15b in the case of a workpiece which is preformed with the surfaces 15a and 15b.

FIGS. 18–21 show several of the operation phases or steps of the apparatus shown in FIGS. 14 and 15. The pattern copying machine has above and below the pattern a copying slide with a vertical slide carrying a miller and arranged downstream therefrom a belt 70 carried on another vertical slide 56. Millers 34 only are shown in FIGS. 18–21.

Figure 18:
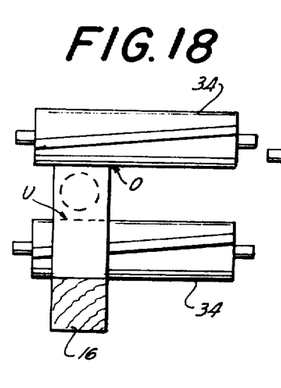
FIGS. 18–21 are end views illustrating operation of the machine of FIGS. 14 and 15.
Figures 19, 20:
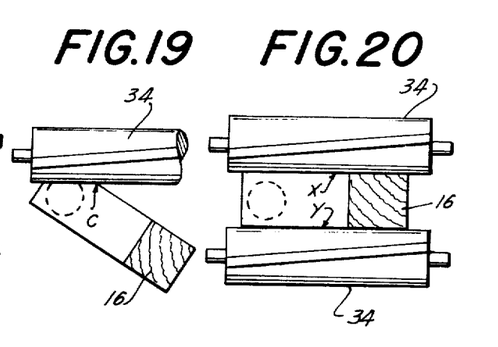
Figure 21:
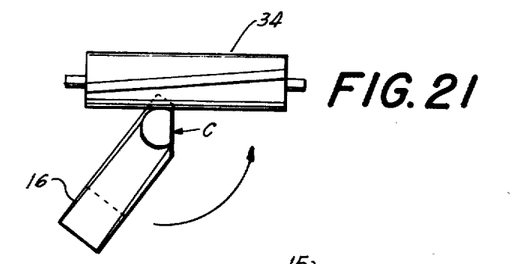

FIG. 18 shows the arrangement wherein the model lies principally in a vertical plane. Its two faces o and u are each machined by a respective miller 34 of the upper and lower copying slides in one longitudinal shaping operation. After lifting of the two millers 34 and 59 the control device S1 effects a counterclockwise rotation of the workpieces 16 through an angle of approximately 30° as indicated in FIG. 19. Then a surface 15a is cut into the workpiece by means of the upper miller 34 in another longitudinal machining operation.

Thereafter the miller 34 is lifted by the control devices S2 and G2 and the other control devices S1 and G1 further effect the rotation of the workpiece and model such that they lie in a position 90° offset to the position of FIG. 18 as shown in FIG. 20. In this position both sides x and y of the workpiece 16 are again machined by the two opposite millers 34. Thereafter the workpieces 16 are rotated continuously with only the miller 34 in contact with them so as to form the round-section portion constituting the lower part of a table leg.

With such an apparatus it is possible to form workpieces both with accurate planar surfaces and smooth round surfaces using the same milling tools and sanding tools. In addition it is possible in a very short time completely to form the workpiece so that it is ready for varnishing or the like and requires no subsequent fine-finishing operations. It should be noted that all of the various motors of the apparatus according to this invention can be provided with automatic brakes so that whenever the motors are stopped the driven element is automatically braked and stops rotating instantly. The workpieces can be of wood or synthetic-resin material or even a soft metal such as aluminum.

I claim:

1. A method of reproducing in an elongated workpiece the contours of an elongated pattern having at least one substantially planar and longitudinally extending surface, said method comprising the steps of:
   suspending said workpiece and said pattern rotatably about respective parallel longitudinal workpiece and pattern axes;
   continuously urging a feeler into engagement with said pattern and urging a shaping tool linked to said feeler into engagement with said workpiece;
   restraining said workpiece and said pattern from rotation temporarily while displacing said feeler longitudinally along said surface to cut into said workpiece with said tool a facet similar to said surface; and synchronously rotating said workpiece and said pattern while displacing said feeler and said tool along said pattern and said workpiece to cut the remainder of the contours of said pattern into said workpiece, said workpiece and said pattern being restrained from rotating at predetermined angular positions each corresponding to a respective planar surface of said pattern.

2. The method defined in claim 1 wherein said workpiece and said pattern are restrained from rotating at predetermined angular positions each corresponding to a respective planar surface of said pattern.

3. The method defined in claim 1 wherein said tool is a milling head serving to mill said workpiece.

4. The method defined in claim 1 wherein said tool is a sanding head serving to sand said workpiece.

5. The method defined in claim 1 wherein said surfaces extend axially only along a predetermined position of the length of said pattern and one such facet is cut into said workpiece during displacement of said feeler and said tool in one direction along said axis and another such facet is cut into said workpiece during opposite displacement of said feeler and said tool.

6. The method defined in claim 5 wherein said feeler and said tool are only displaced along said predetermined portion of the pattern length during restraint of rotation of said pattern and cutting of said facets.

7. The method defined in claim 5 further comprising the steps of:

suspending rotatably a lifter pattern about a respective lifter axis with said workpiece and the first pattern, said lifter pattern having substantially the contours of said first pattern but formed in places corresponding to said planar surfaces with elevated regions;

urging the first-mentioned feeler against said first pattern during cutting of said facets; and urging another feeler linked to said tool against said lifter pattern after cutting of said facets to lift said tool from said workpiece during synchronous rotation of said pattern and said workpiece about their respective axes after cutting said facet.

8. An apparatus for shaping an elongated workpiece, said apparatus comprising:

an elongated pattern having at least one substantially planar and longitudinally extending surface;

means for suspending said workpiece and said pattern rotatably about respective parallel longitudinal workpiece and pattern axes;

a slider displaceable axially along said workpiece and said pattern;

a feeler on said slider engageable with said pattern and a tool on said slider engageable with said workpiece and linked to said feeler;

means for restraining rotation of said workpiece and said pattern about said axes and for simultaneously displacing said slider axially with said feeler riding along said surface and said tool cutting a corresponding facet in said workpiece; and means for synchronously rotating said workpiece and said pattern to cut the remainder of the contours of said pattern into said workpiece with said tool.

9. The apparatus defined in claim 8 wherein said tool is abrasive, said slider being provided with means for rotating said head.

10. The apparatus defined in claim 9 wherein said slider is provided with at least two such axially spaced tools.

* * * * *